(12) United States Patent
Hirai et al.

(10) Patent No.: US 7,522,251 B2
(45) Date of Patent: Apr. 21, 2009

(54) LIQUID CRYSTAL DISPLAY DEVICE AND MANUFACTURING METHOD THEREOF

(75) Inventors: Sadafumi Hirai, Mobara (JP); Setsuo Kobayashi, Mobara (JP); Katsuhiko Ishii, Chosei (JP); Hiroaki Miwa, Yokohama (JP)

(73) Assignee: Hitachi Displays, Ltd., Mobara-shi (JP)

( * ) Notice: Subject to any disclaimer, the term of this patent is extended or adjusted under 35 U.S.C. 154(b) by 0 days.

(21) Appl. No.: 11/958,419

(22) Filed: Dec. 18, 2007

(65) Prior Publication Data
US 2008/0212012 A1 Sep. 4, 2008

(30) Foreign Application Priority Data
Dec. 18, 2006 (JP) .............................. 2006-339397

(51) Int. Cl.
*G02F 1/1339* (2006.01)
(52) U.S. Cl. .......................... 349/153; 349/190; 438/30
(58) Field of Classification Search ................. 349/153, 349/190; 438/30; 257/E33.056
See application file for complete search history.

(56) References Cited
U.S. PATENT DOCUMENTS
7,443,481 B2 * 10/2008 Wu et al. .................... 349/190

2006/0139563 A1 6/2006 Momose et al.

FOREIGN PATENT DOCUMENTS
JP 2006-184381 7/2006

* cited by examiner

*Primary Examiner*—Brian Healy
*Assistant Examiner*—Michael P Mooney
(74) *Attorney, Agent, or Firm*—Antonelli, Terry, Stout & Kraus, LLP.

(57) ABSTRACT

To provide a liquid crystal display device in which a seal width at a cutting portion of substrates is small and defects caused at the time of cutting the substrates can be reduced. There is provided a liquid crystal display device including a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, wherein the sealing material includes a ring portion in a ring shape which configures the liquid crystal enclosure area and whose whole circumference is closed, and a first extension portion and a second extension portion, each of which is integrally connected to the ring portion and is arranged outside the ring portion, the first extension portion extends up to a cut-end portion of a first side of the liquid crystal display panel, the second extension portion extends up to a cut-end portion of a second side of the liquid crystal display panel, the second side being opposed to the first side, and in a state where the first substrate and the second substrate are stuck together, $W2 \leqq W1 \leqq 1.2 W2$ is satisfied where $W1$ represents a seal width of the first extension portion and a seal width of the second extension portion, and $W2$ represents a seal width of the ring portion.

20 Claims, 8 Drawing Sheets

LIQUID CRYSTAL DISPLAY DEVICE AND MANUFACTURING METHOD THEREOF

CLAIM OF PRIORITY

The present application claims priority from Japanese Application JP 2006-339397 filed on Dec. 18, 2006, the content of which is hereby incorporated by reference into this application.

BACKGROUND OF THE INVENTION

1. Field of the Invention

The present invention relates to a liquid crystal display device and a manufacturing method thereof, and particularly to a liquid crystal display device and a manufacturing method thereof for coating a substrate with a sealing material by using a dispenser.

2. Description of the Related Art

Liquid crystal display devices have been adopted as display devices with various sizes, raging from small-sized portable phones to large-sized TVs. A liquid crystal display panel of the liquid crystal display device includes a first substrate, a second substrate, a sealing material through which the first substrate and the second substrate are stuck together, and a liquid crystal enclosed inside a liquid crystal enclosure area encircled by the first substrate, the second substrate, and the sealing material.

Methods of forming a sealing material include a method of coating by using a dispenser and a method in which the sealing material is formed by printing, such as screen printing. Further, methods of enclosing a liquid crystal include a method in which a liquid crystal enclosure port is provided at a part of the sealing material to inject a liquid crystal from the liquid crystal enclosure port, and the liquid crystal enclosure port is sealed with an end-sealing material. Other methods include a liquid crystal dropping-enclosure method in which the sealing material is formed in a ring shape (for example, a rectangular shape) with the whole circumference closed without providing the liquid crystal enclosure port in the sealing material so as to drop a liquid crystal into the inside of the ring portion, and then the first substrate and the second substrate are stuck together for enclosure. Moreover, in the case of manufacturing the liquid crystal display panels, there is performed a gang printing in which plural liquid crystal display panels are formed by arranging on a mother substrate, and the mother substrate is cut so as to be separated into individual liquid crystal display panels.

FIG. 9 is a plan view explaining an example of a coating pattern of the sealing materials by using a conventional dispenser. In FIG. 9, by allowing the dispenser to move along a track TR, the ring portion configured by a sealing material SL4 and an extension portion configured by a sealing material SL5 are formed without stopping the discharge of the sealing material. At a portion of the sealing material SL5, the dispenser reciprocates, but a center position of a seal width is displaced from another one for drawing. Then, a liquid crystal is dropped into a liquid crystal enclosure area LCA encircled by the ring portion.

FIG. 10 is a plan view explaining another example of a coating pattern of the sealing materials by using the conventional dispenser. Such a pattern is disclosed in, for example, Japanese Unexamined Patent Application Publication No. 2006-184381. In FIG. 10, the substrate is coated with a sealing material SL1 having a seal width W3 while allowing the dispenser to move along a track TR1. Next, the substrate is coated with a sealing material SL2 having a seal width W4 while allowing the dispenser to meander along tracks TR2 to TR10. Thereafter, a crystal liquid is dropped and the substrates are stuck together. FIG. 10 shows a case in which two ring portions are formed for a gang printing.

FIG. 11 is a plan view explaining a case in which the substrates are stuck together by using the sealing materials in FIG. 10. In a state where the substrates are stuck together, the sealing materials SL1 and SL2 are squeezed and spread. As a result, the seal width W2>W4 is satisfied in the ring portion, and the seal width W1>W3 is satisfied in the extension portions other than the ring portion. In addition, since the substrate is coated with the sealing materials SL1 and SL2 in parallel in the extension portions, W1>W2 is satisfied. Thereafter the substrates are cut at a cutting line CTL.

However, in the pattern shown in FIG. 9, there is formed an unnecessary portion on the substrate by a distance d of the extension portion of the sealing material SL5.

In the case of the patterns shown in FIGS. 10 and 11, the unnecessary area with the distance d as shown in FIG. 9 is not generated when two-dimensionally arranging the ring portions in the gang printing. However, as shown in FIG. 11, the seal width W1 at the cutting line CTL increases, and thus there is a possibility that defects are generated at the time of cutting.

FIG. 12 is a plan view explaining still another example of a coating pattern of the sealing materials by using the conventional dispenser. FIG. 13 is a cross sectional view in FIG. 12. FIG. 13 illustrates portions of the tracks TR5 to TR7 in FIG. 12, and shows a state in which the dispenser is moved in the mid-course of the track TR7. FIG. 14 is a plan view explaining a case in which the substrates are stuck together by using the sealing materials in FIG. 12.

FIG. 12 is different from FIG. 10 in that double-drawing areas DDs of the sealing materials are provided at portions of the tracks TR2, TR6, and TR10. In this case, as shown in FIG. 13, a gap g ranging from a surface of a mother substrate MSUB1 to a dispenser DSP is as high as twice, or more, a height h ranging from a surface of the mother substrate MSUB1 to an upper face of the sealing material SL1 with which the substrate is already coated. Accordingly, the sealing material SL2 is overlappingly coated on the sealing material SL1 at the double-drawing areas DDs. As a result, as shown in FIG. 14, the seal width W1 at the cutting line CTL increases, and thus there is a possibility that defects are generated at the time of cutting, as similar to the case of FIG. 11.

Objects other than the above-described objects become apparent from the description of the whole specification and the drawings.

In the liquid crystal display device according the present invention, a relation between the seal width W1 at the cut-end portion of the substrates and the seal width W2 of the ring portion is represented as $W2 \leq W1 \leq 1.2 W2$.

In the manufacturing method of a liquid crystal display device according to the present invention, when the dispenser passes over the sealing material with which the substrate is already coated, the dispenser passes over the same in a state where a seal discharge amount per unit length is smaller than that with which the dispenser passes for the first time. It is desirable that the dispenser satisfy $0.8h \leq g \leq 1.2h$ where g represents a gap ranging from a surface of the first substrate to the dispenser and h represents a height ranging from a surface of the first substrate to an upper face of the sealing material with which the first substrate is already coated.

SUMMARY OF THE INVENTION

The present invention can be configured as follows, for example.

(1) A liquid crystal display device including a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, wherein the sealing material includes a ring portion in a ring shape which configures the liquid crystal enclosure area and whose whole circumference is closed, and a first extension portion and a second extension portion, each of which is integrally connected to the ring portion and is arranged outside the ring portion, the first extension portion extends up to a cut-end portion of a first side of the liquid crystal display panel, the second extension portion extends up to a cut-end portion of a second side of the liquid crystal display panel, the second side being opposed to the first side, in a state where the first substrate and the second substrate are stuck together, $W2 \leq W1 \leq 1.2W2$ is satisfied where W1 represents a seal width of the first extension portion and a seal width of the second extension portion, and W2 represents a seal width of the ring portion.

(2) In (1), the present invention may be configured in such a manner that the first extension portion and the second extension portion are present on an extended line of a side of the ring portion.

(3) In (1) or (2), the present invention may be configured in such a manner that the sealing material is formed by coating using a dispenser, the sealing material is configured by a first drawing pattern including a first side of the ring portion and a second drawing pattern including a second side, a third side and a fourth side, other than the first side, of the ring portion, and the dispenser passes over the first extension portion and the second extension portion during the time the dispenser draws both of the first drawing pattern and the second drawing pattern.

(4) A manufacturing method of a liquid crystal display device including a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, the sealing material including a ring portion in a ring shape which configures the liquid crystal enclosure area and whose whole circumference is closed, and a first extension portion and a second extension portion, each of which is integrally connected to the ring portion and is arranged outside the ring portion, the method including: a first coating step in which the dispenser is allowed to move in a first drawing pattern on the first substrate and the first substrate is coated with the sealing material configuring a part of the ring portion, the first extension portion, and the second extension portion; a second coating step in which after the first coating step, the dispenser is allowed to move in a second drawing pattern on the first substrate and the first substrate is coated with the sealing material configuring the rest of the ring portion; a liquid crystal dropping step in which the liquid crystal is dropped into the inside of the ring portion; a sticking step in which after the liquid crystal dropping step, the first substrate and the second substrate are stuck together; and a cutting step in which after the sticking step, the first substrate and the second substrate are cut in the mid-course of the first extension portion and in the mid-course of the second extension portion, wherein the first extension portion and the second extension portion are arranged on sides, which are opposed to each other, of the liquid crystal display panel, in the second coating step, the dispenser passes over the first extension portion and the second extension portion in a state where a seal discharge amount per unit length is smaller than that for the ring portion, and in a state where the first substrate and the second substrate are stuck together, $W2 \leq W1 \leq 1.2W2$ is satisfied where W1 represents a seal width of the first extension portion and a seal width of the second extension portion, and W2 represents a seal width of the ring portion.

(5) In (4), the present invention may be configured in such a manner that in the second coating step, the dispenser passes over the first extension portion and the second extension portion in a state where $0.8h \leq g \leq 1.2h$ is satisfied where g represents a gap ranging from a surface of the first substrate to the dispenser and h represents a height ranging from a surface of the first substrate to an upper face of the sealing material of the first extension portion and the second extension portion.

(6) In (4) or (5), the present invention may be configured in such a manner that prior to the cutting step, a second ring portion connected to the ring portion through the first extension portion and a third ring portion connected to the ring portion through the second extension portion are provided.

(7) In (6), the present invention may be configured in such a manner that prior to the cutting step, the second ring portion is connected to a fourth ring portion through the sealing material having a third extension portion extending in a direction crossing the extension direction of the first extension portion.

(8) A manufacturing method of a liquid crystal display device including a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, wherein when the first substrate is coated with the sealing material by a dispenser, the dispenser passes over the same position twice, and the dispenser passes over the sealing material with which the first substrate is already coated in a state where $0.8h \leq g \leq 1.2h$ is satisfied where g represents a gap ranging from a surface of the first substrate to the dispenser and h represents a height ranging from a surface of the first substrate to an upper face of the sealing material with which the first substrate is already coated, and in a state where a seal discharge amount per unit length is smaller than that with which the dispenser passes over for the first time.

(9) In (8), the present invention may be configured in such a manner that the sealing material includes a ring portion in a ring shape which configures the liquid crystal enclosure area and whose whole circumference is closed.

(10) In (9), the present invention may be configured in such a manner that the sealing material includes a first extension portion and a second extension portion, each of which is integrally connected to the ring portion and is arranged outside the ring portion, the first extension portion extends up to a cut-end portion of a first side of the liquid crystal display panel, and the second extension portion extends up to a cut-end portion of a second side of the liquid crystal display panel, the second side being opposed to the first side.

(11) In (10), the present invention may be configured in such a manner that the dispenser passes over each of the first extension portion and the second extension portion twice.

(12) In (11), the present invention may be configured in such a manner that in a state where the first substrate and the second substrate are stuck together, $W2 \leqq W1 \leqq 1.2W2$ is satisfied where W1 represents a seal width of the first extension portion and a seal width of the second extension portion, and W2 represents a seal width of the ring portion.

(13) In (10), the present invention may be configured in such a manner that in a state where the first substrate and the second substrate are stuck together, $W2 \leqq W1 \leqq 1.2W2$ is satisfied where W1 represents a seal width of the first extension portion and a seal width of the second extension portion, and W2 represents a seal width of the ring portion.

(14) In any one of (10) to (13), the present invention may be configured in such a manner that the first extension portion and the second extension portion are present on an extended line of a side of the ring portion.

(15) In any one of (10) to (14), the present invention may be configured in such a manner that prior to cutting of the first substrate and the second substrate in a state where the first substrate and the second substrate are stuck together, a second ring portion connected to the ring portion through the first extension portion and a third ring portion connected to the ring portion through the second extension portion are provided.

(16) In (15), the present invention may be configured in such a manner that prior to cutting of the first substrate and the second substrate in a state where the first substrate and the second substrate are stuck together, the second ring portion is connected to a fourth ring portion through the sealing material having a third extension portion extending in a direction crossing the extension direction of the first extension portion.

The configurations explained above are merely examples, and the present invention can be appropriately changed in a range without departing from its technical idea. Configuration examples of the present invention other than the above-described configurations become apparent from the description of the whole specification and the drawings.

Representative effects achieved by the present invention are as follows.

Since the seal width at the cutting portion of the substrates is small, the present invention can provide a liquid crystal display device in which defects caused at the time of cutting the substrates can be reduced.

Even when the sealing material is formed using the dispenser in a double-drawing manner, the present invention can provide a liquid crystal display device in which the seal width is small after sticking the substrates together.

Other effects of the present invention become apparent from the description of the whole specification.

DESCRIPTION OF THE PREFERRED EMBODIMENTS

Figure 1:
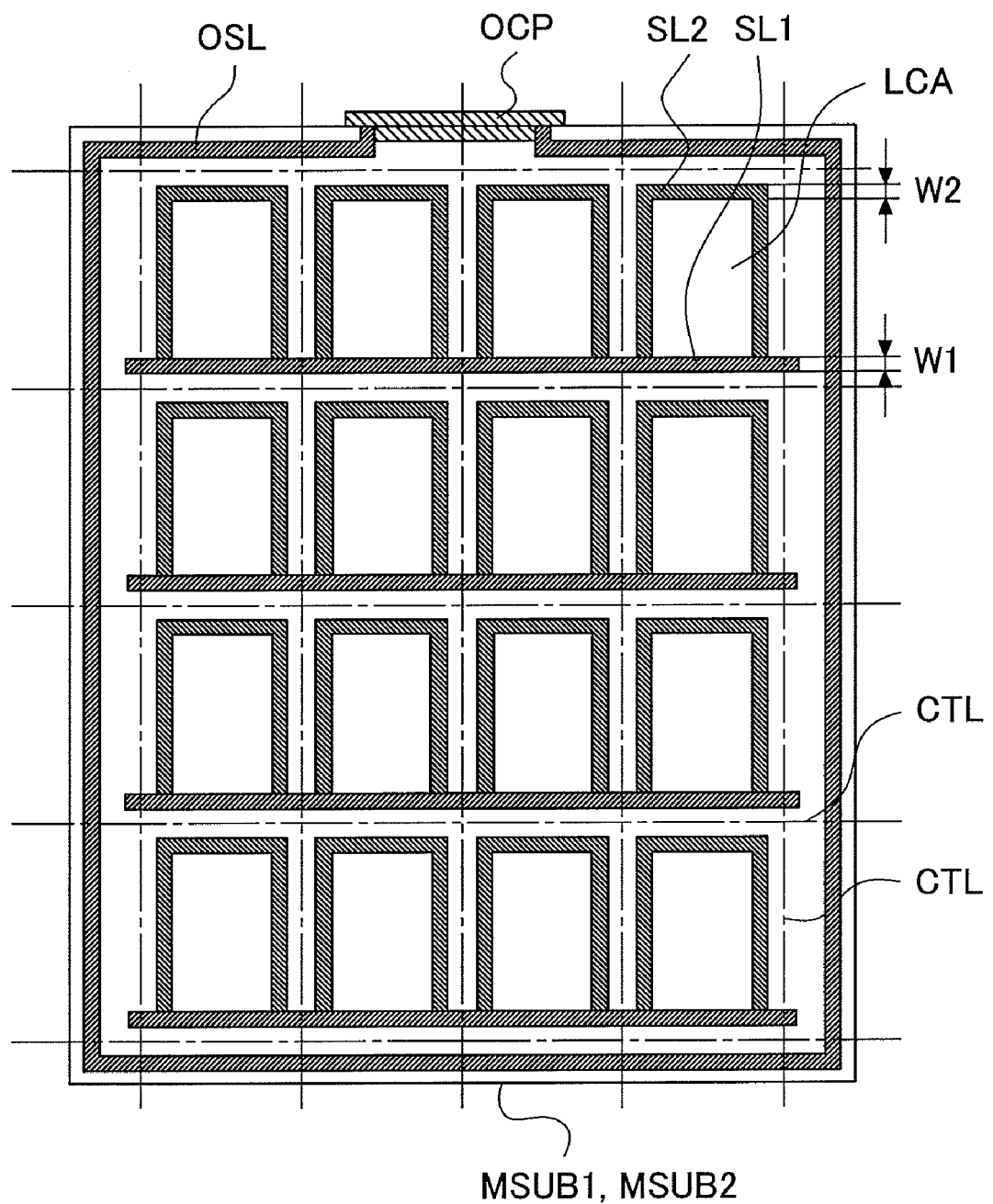
FIG. 1 is a plan view explaining an example of a coating pattern of sealing materials by using a dispenser according to a first embodiment of the present invention.

Embodiments of the present invention will be described with reference to the drawings. It should be noted that the identical or like constituent elements are given the same reference numerals in the respective drawings and embodiments, and the explanations thereof are therefore omitted.

First Embodiment

FIG. 1 is a plan view explaining an example of a coating pattern of sealing materials by using a dispenser according to a first embodiment of the present invention. In FIG. 1, there is illustrated a case of 16 panels with 4 horizontal rows and 4 vertical rows. FIG. 1 shows a state in which after dropping a liquid crystal into each of liquid crystal enclosure areas LCAs, mother substrates MSUB1 and MSUB2 are stuck together through sealing materials SL1 and SL2. A ring portion configuring each of the liquid crystal enclosure areas LCAs is configured by the sealing materials SL1 and SL2 with which the substrate is coated by the dispenser. Further, the adjacent ring portions are connected to each other through extension portions, each of which is configured by a part of the sealing material SL1.

At an outer circumference of the mother substrates MSUB1 and MSUB2, there is formed an outer sealing material OSL. The outer sealing material OSL has an opening at a certain position, and the opening functions as an air vent hole. In addition, the opening is sealed with an end-sealing material OCP after sticking the mother substrates MSUB1 and MSUB2 together. Accordingly, in the case where at least one of the mother substrates MSUB1 and MSUB2 is made thinner by polishing, a polishing agent or an etching liquid is prevented from entering the inside encircled by the outer sealing material OSL.

The mother substrates MSUB1 and MSUB2 are cut at cutting lines CTLs so as to be separated into individual liquid crystal display panels. At this time, a seal width W1 of the extension portion at the cutting line CTL is formed so as to be substantially the same as a seal width W2 of the ring portion, or slightly larger than the seal width W2 (for example, +20% or less). Since the seal width W1 at the cutting portion of the substrates is smaller, defects caused at the time of cutting the substrates can be reduced. In the case where the seal width partially varies and can not be primarily determined, a mean value of the seal widths W1 and W2 may be used.

Figure 2:
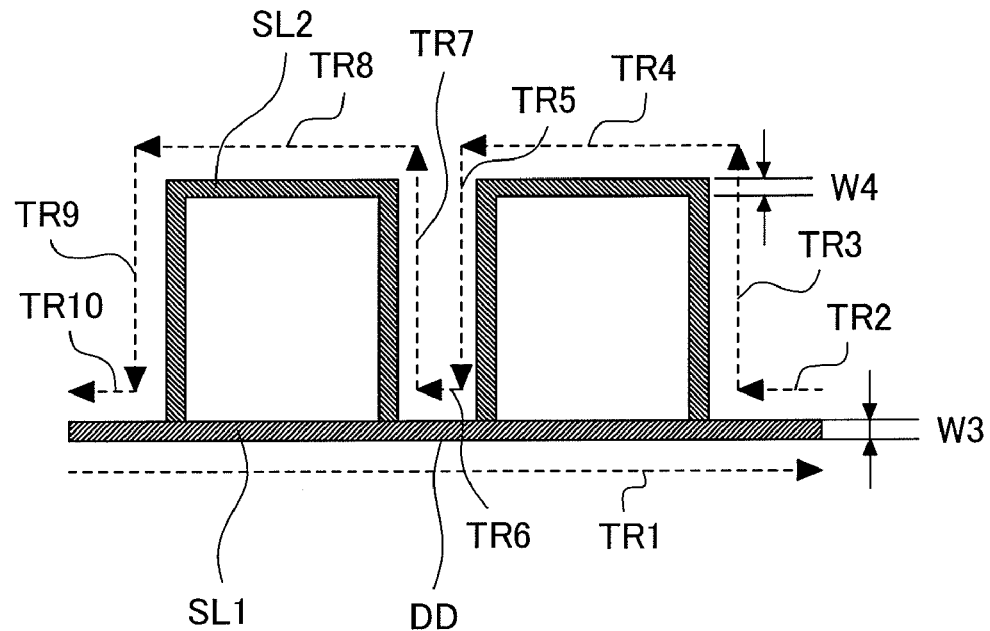
FIG. 2 is a plan view explaining a coating method of the sealing materials by the dispenser according to the first embodiment of the present invention.

FIG. 2 is a plan view explaining a coating method of the sealing materials according to the first embodiment of the present invention. In FIG. 2, in order to facilitate understanding, two adjacent ring portions are extracted for explanation. In FIG. 2, while the dispenser is allowed to move along a track TR1, the substrate is coated with the sealing material SL1 having a seal width W3. Next, while the dispenser is allowed to meander along tracks TR2 to TR10, the substrate is coated with the sealing material SL2 having a seal width W4. Thereby, it is possible to continuously draw a pattern with the sealing materials SL1 and SL2 without stopping the discharge of the sealing material. Here, it is desirable that the seal width W4 be substantially the same as the seal width W3 (difference by ±10%).

Figure 12:
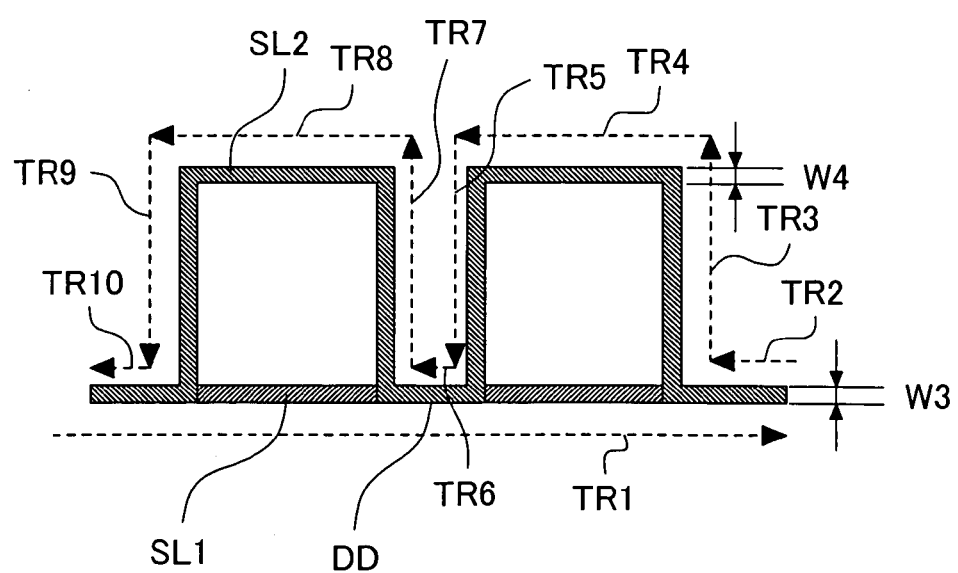
FIG. 12 is a plan view explaining still another example of a coating pattern of the sealing materials by using the conventional dispenser.

Even in FIG. 2, the track TR1 overlaps with portions of the tracks TR2, TR6 and TR10, as similar to FIG. 12. That is, double-drawing areas DDs of the sealing materials are generated at these portions. However, FIG. 2 is different from FIG. 12 in that when the dispenser passes over the sealing material with which the substrate is already coated (that is, when the dispenser passes for the second time), the dispenser is allowed to pass over the sealing material with which the substrate is already coated in a state where a seal discharge amount per unit length is smaller than that with which the dispenser passes for the first time (that is, the dispenser passes in a state where the sealing material is not formed on the substrate yet). Specifically, it is desirable that the seal discharge amount per unit length be 0 or substantially 0 (at most, 20% or less of the amount with which the dispenser passes for the first time).

Figure 3:
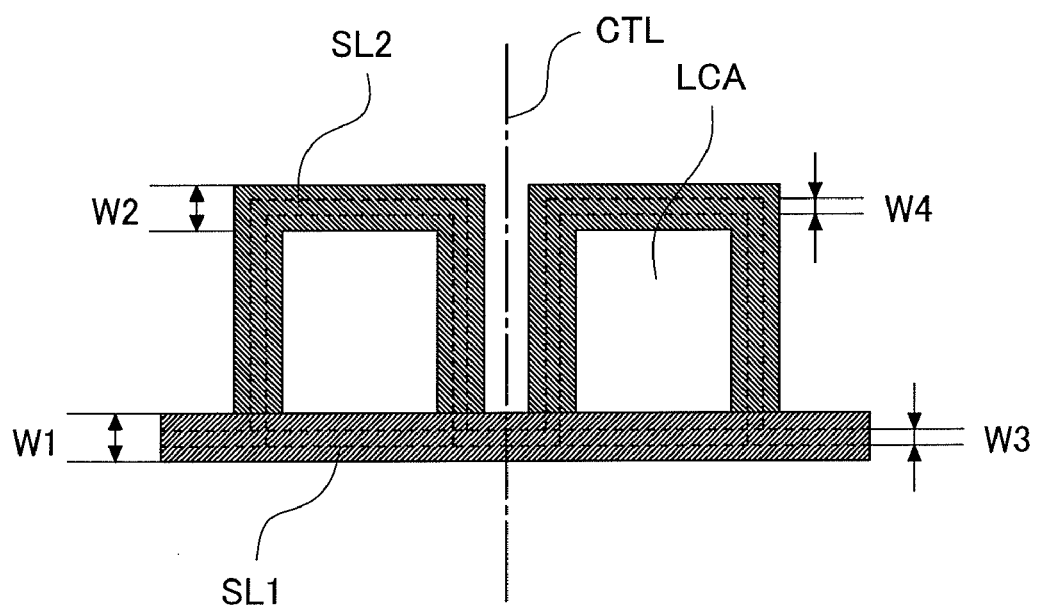
FIG. 3 is a plan view explaining a case in which substrates are stuck together by using the sealing materials in FIG. 2.

FIG. 3 is a plan view explaining a case in which the substrates are stuck together by using the sealing materials in FIG. 2. By coating the substrate in a manner described in FIG. 2, it is possible to satisfy a relation between the seal width W1 at the cutting line CTL (at an end of the cut substrate) and the seal width W2 of the ring portion, as $W2 \leq W1 \leq 1.2W2$. In the case where the seal width W3 is substantially equal to the seal width W4, the seal width of the ring portion configured by the seal SL1 is equal to the seal width W2 of the seal SL2.

Figure 4:
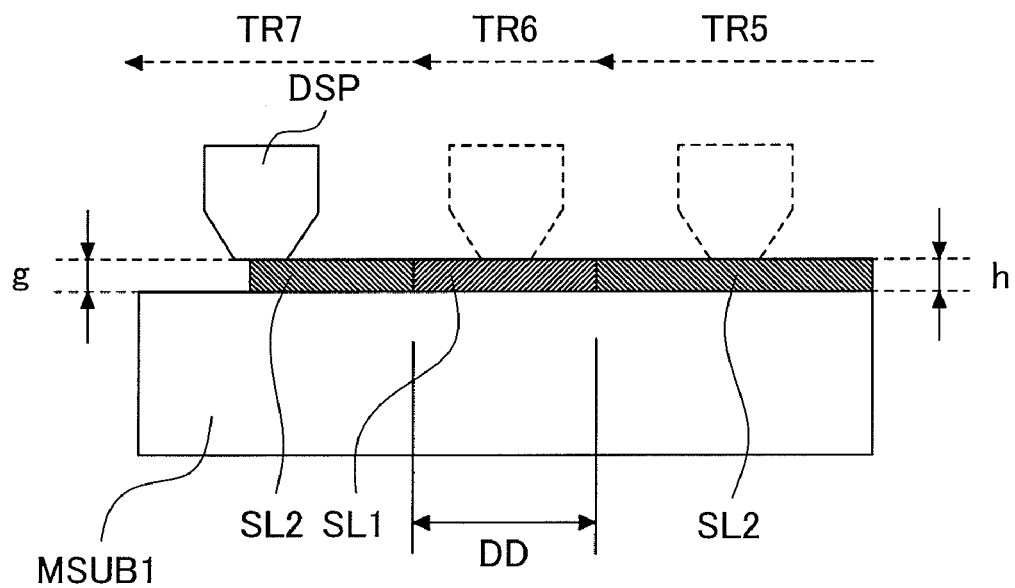
FIG. 4 is a cross sectional view in FIG. 2.
Figure 5:
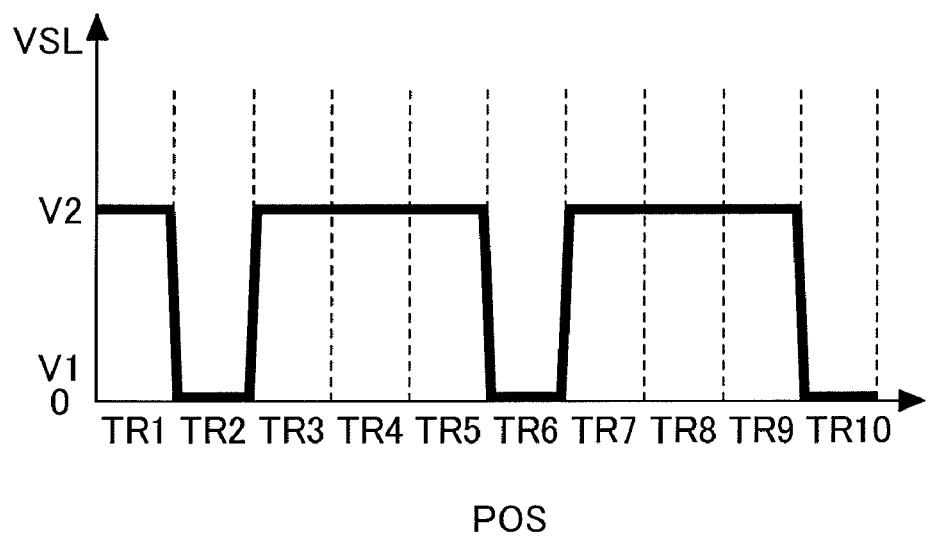
FIG. 5 is a graph explaining a relation between dispenser positions and seal discharge amounts per unit length.
Figure 13:
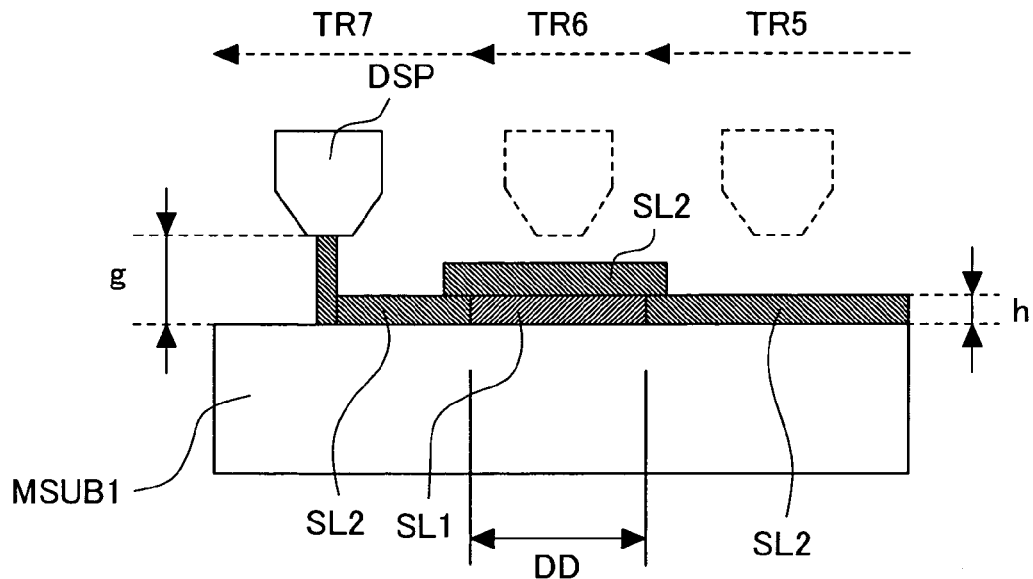
FIG. 13 is a cross sectional view in FIG. 12.
Figure 14:
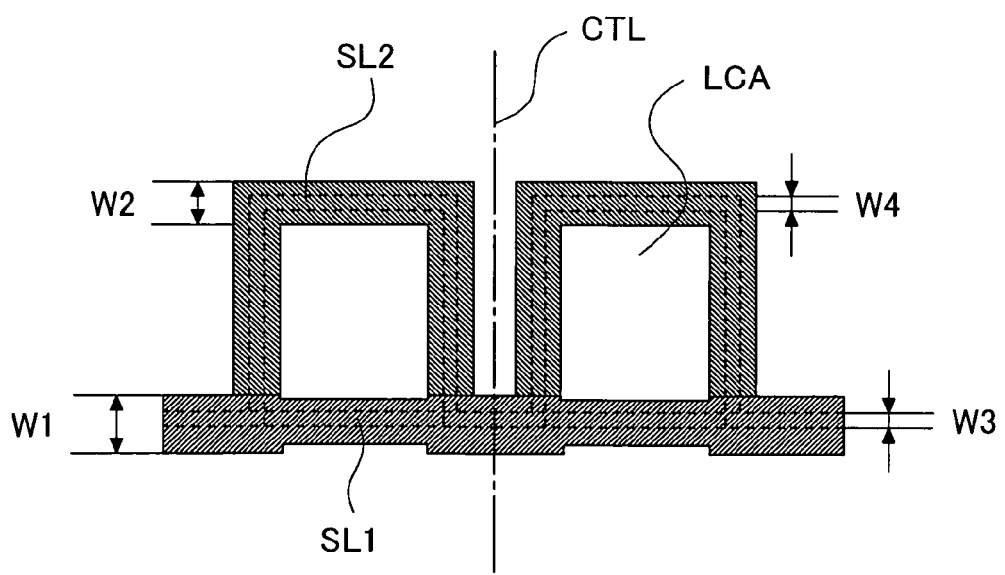
FIG. 14 is a plan view explaining a case in which the substrates are stuck together by using the sealing materials in FIG. 12.

FIG. 4 is a cross sectional view in FIG. 2. FIG. 5 is a graph explaining a relation between dispenser positions and seal discharge amounts per unit length. FIG. 4 illustrates portions of the tracks TR5 to TR7 in FIG. 2 and shows a state in which the dispenser is located in the mid-course of the track TR7. FIG. 4 is different from FIG. 13 in that a gap g ranging from a surface of the mother substrate MSUB1 to the dispenser DSP is substantially equal to a height h ranging from a surface of the mother substrate MSUB1 to an upper face of the sealing material SL1 with which the substrate is already coated. Accordingly, when the dispenser passes over the double-drawing area DD at the track TR6 for the second time, the sealing material is hardly discharged from the dispenser, thus easily realizing the control of the discharge amounts as explained in FIG. 2.

However, in consideration of ±10% of the control accuracy for the gap g, there is a possibility that the gap g by which the dispenser passes for the second time is not equal to the height h of the seal with which the substrate is coated when the dispenser passes for the first time. Therefore, it is desirable that the gap g be controlled in a range satisfying $0.8h \leq g \leq 1.2h$.

For example, in the graph where the horizontal axis represents a dispenser position POS and the vertical axis represents a seal discharge amount VSL per unit length as shown in FIG. 5, each of the seal discharge amounts VSLs per unit length at the tracks TR1, TR3 to TR 5, and TR7 to TR9 where the double-drawing is not performed is V2. On the contrary, each of the seal discharge amounts VSLs per unit length at the tracks TR2, TR6 and TR10 that are the double-drawing areas DDs is V1 that is smaller than V2. It is desirable that V1 be 0 in an ideal sense. However, it is difficult to perfectly control V1 to 0. Accordingly, when assuming a case where the seal discharge amounts are controlled in a range satisfying $0.8h \leq g \leq 1.2h$, $0 \leq V1 \leq 0.2V2$ is satisfied. The seal widths W1 and W2 obtained after sticking the substrates together are substantially in proportion to the seal discharge amounts VSLs per unit length and the seal height h prior to sticking of the substrates together. Therefore, if the above condition is satisfied, $W2 \leq W1 \leq 1.2W2$ can be realized.

Figure 6:
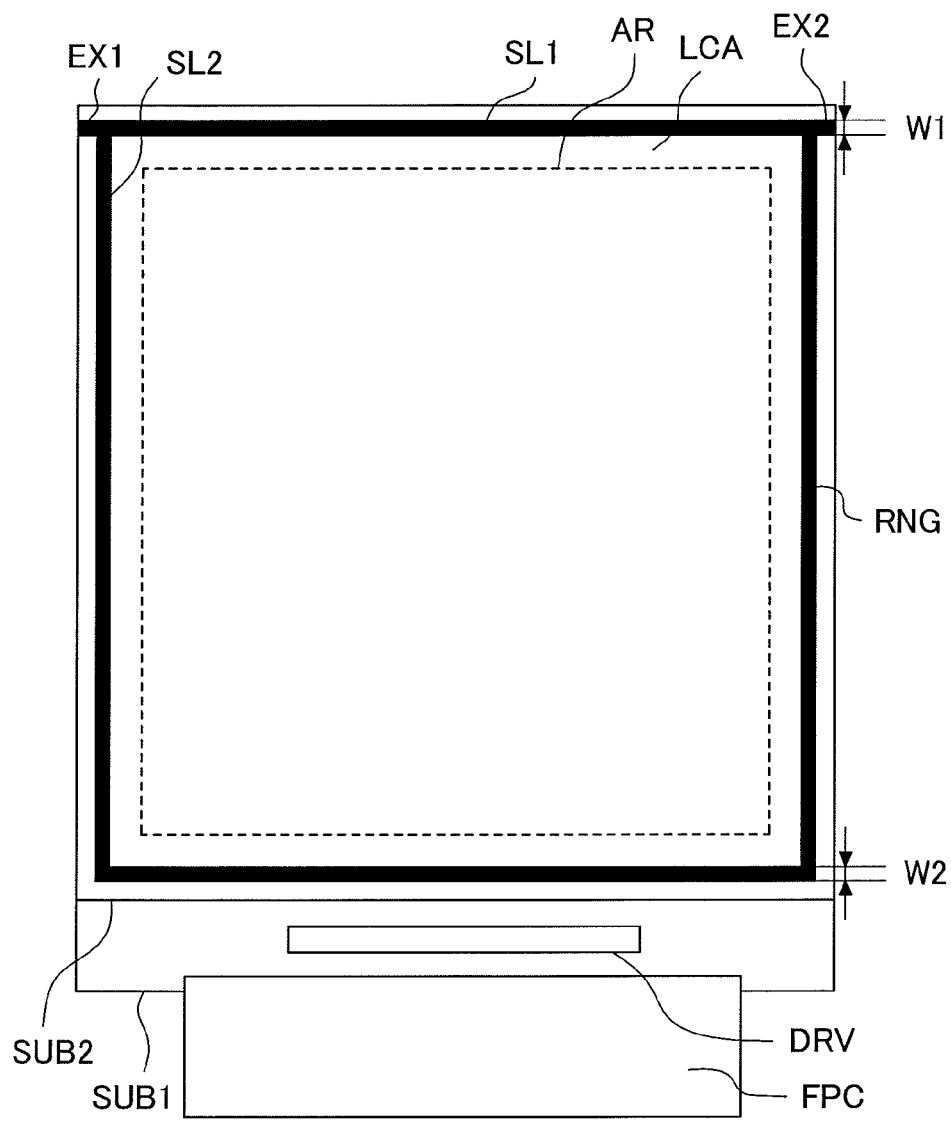
FIG. 6 is a plan view showing an example of a liquid crystal display device according to the first embodiment of the present invention.

FIG. 6 is a plan view showing an example of a liquid crystal display device according to the first embodiment of the present invention. FIG. 6 shows a shape of a liquid crystal display panel after being individually separated. A frame area is present around a display area AR, and a ring portion RNG configured by the sealing materials SL1 and SL2 is formed at a part of the frame area. Outside the ring portion RNG, there are formed extension portions EX1 and EX2 while being integrally connected to the ring portion RNG.

The first extension portion EX1 extends up to a cut-end portion of a first side of the liquid crystal display panel.

The second extension portion EX2 extends up to a cut-end portion of a second side, of the liquid crystal display panel, opposed to the first side. By adopting the configuration in which the extension portions EX1 and EX2 extend up to the cut-end portions of the sides that are opposed to each other, even in the case where the sealing material is formed without stopping the discharge of the sealing material by using the dispenser for the gang printing, the ring portions RNG can be drawn in a state where three or more ring portions RNG are allowed to align in the same direction and are coupled to each other through the extension portions EX1 and EX2.

It should be noted that one side of a substrate SUB2 recedes from a substrate SUB1. At a portion where the substrate SUB1 protrudes from the substrate SUB2, there are mounted a driver DRV for driving the liquid crystal display panel and a flexible wiring substrate FPC. However, the present invention is not limited to such a configuration. For example, the driver DRV may be an incorporated circuit, unlike an external driver, and may be integrally formed on the substrate SUB1 by using a thin film transistor. Other configurations, such as a pixel structure and a driving method, are not particularly limited, and thus the configurations may be appropriately changed.

In the first embodiment, there is explained the case, as an example, in which the mother substrate MSUB1 is coated with the sealing material. However, the present invention is not limited thereto, but the mother substrate MSUB2 may be coated with the sealing material.

In addition, in the first embodiment, a step of curing the sealing materials is performed after a step of sticking the substrates together and before a step of cutting the substrates. A method that is the same as an ordinarily-executed method (the UV curing, the heat curing, and a combination of the UV curing and the heat curing) can be applied to the curing step, and thus its detailed explanation is omitted.

Second Embodiment

Figure 7:
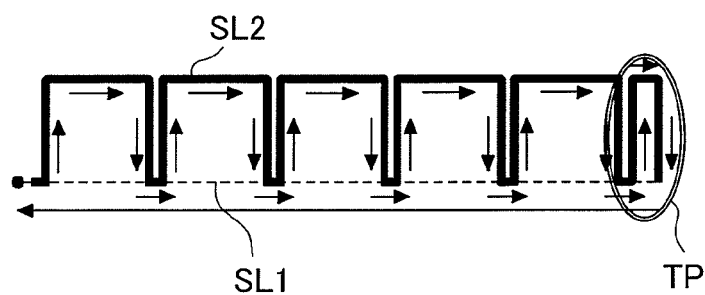
FIG. 7 is a plan view explaining an example of a coating pattern of the sealing materials by using the dispenser according to a second embodiment of the present invention.

FIG. 7 is a plan view explaining an example of a coating pattern of the sealing materials by using the dispenser according to a second embodiment of the present invention. The second embodiment is different from the first embodiment in that when the sealing material is formed without stopping the discharge of the sealing material, the dispenser does not immediately turn back the track where the dispenser has passed, and a turning-back pattern TP is provided, as shown in FIG. 7.

In the coating method as in FIG. 2 according to the first embodiment, due to the fact that the dispenser is moved in the opposite direction from TR1 to TR2 in a short period of time, the dispenser is caused to oscillate, thus deteriorating the seal shape. In the second embodiment, the formation of the portion TP, as shown in FIG. 7, avoids an operation such as the movement of the dispenser toward the opposite direction in a short period of time. Thus, according to the second embodiment, the seal shape at the turning-back portion can be stabilized.

Third Embodiment

Figure 8:
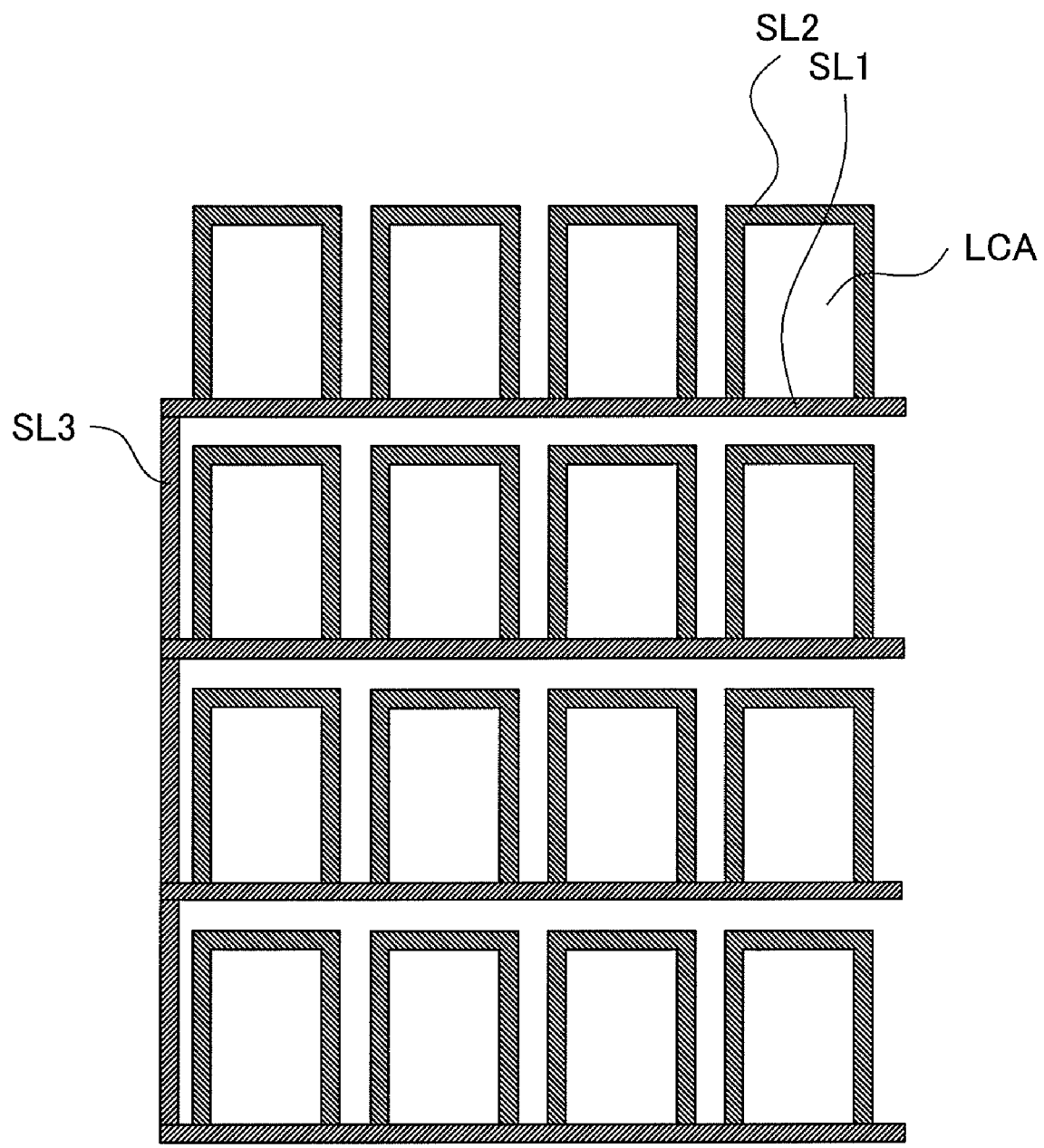
FIG. 8 is a plan view explaining an example of a coating pattern of the sealing materials by using the dispenser according to a third embodiment of the present invention.
Figure 9:
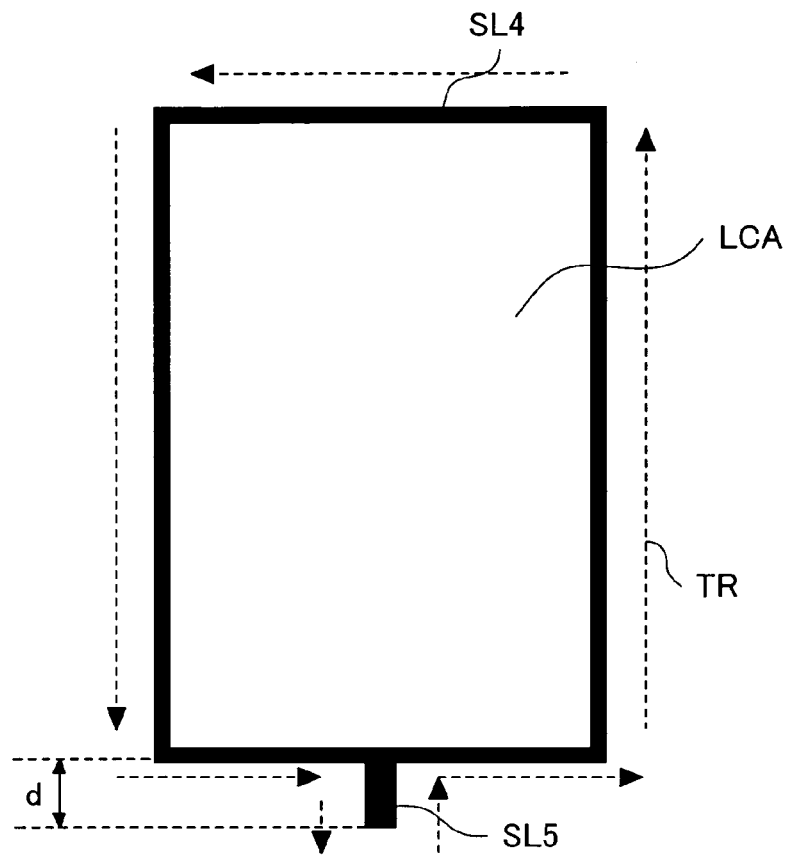
FIG. 9 is a plan view explaining an example of a coating pattern of the sealing materials by using a conventional dispenser.
Figure 10:
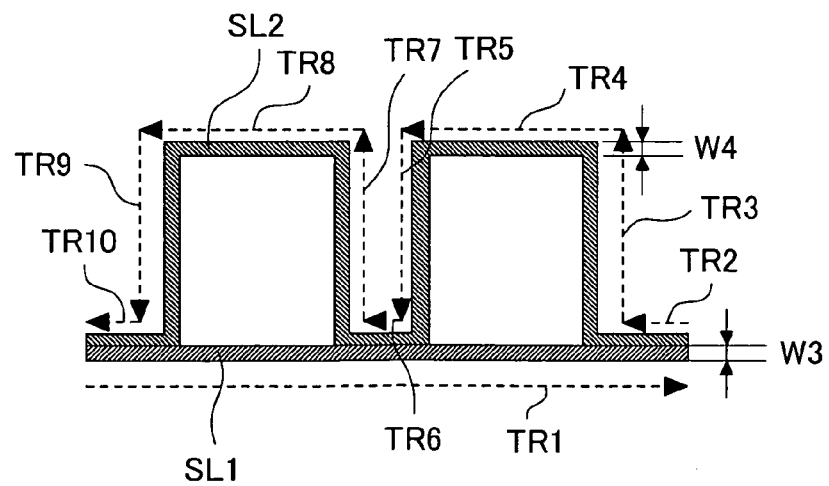
FIG. 10 is a plan view explaining another example of a coating pattern of the sealing materials by using the conventional dispenser.
Figure 11:
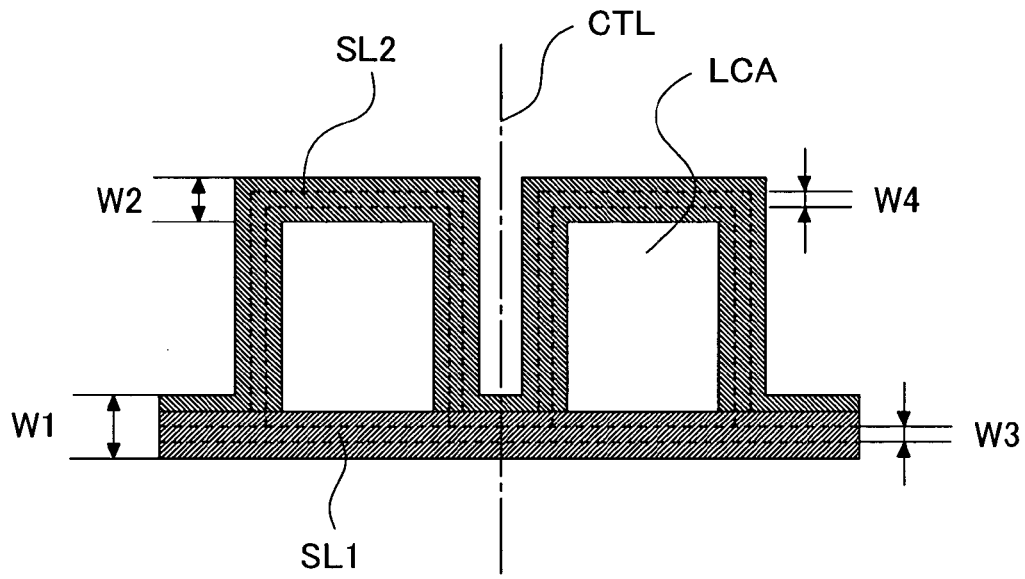
FIG. 11 is a plan view explaining a case in which the substrates are stuck together by using the sealing materials in FIG. 10.

FIG. 8 is a plan view explaining an example of a coating pattern of the sealing materials by using the dispenser according to a third embodiment of the present invention. The third embodiment is different from the first embodiment in that the ring portions are connected to those located in the next lower row in the gang printing through a sealing material SL3 having another extension portion that extends in a direction crossing the extension direction of the extension portions EX1 and EX2. Therefore, the ring portions including those arranged in the next lower row in the gang printing can be drawn without stopping the discharge of the sealing material.

Fourth Embodiment

In the first embodiment, the substrate is coated with the sealing material SL1 first. However, the present invention is not limited thereto, and the substrate may be coated with the sealing material SL2 first. In this case, the dispenser may adversely tracks the order of the tracks TR1 to TR10 explained in the first embodiment.

Fifth Embodiment

In the first embodiment, the gap g is made substantially equal to the seal height h so as to control the seal discharge amounts, as explained in FIG. 4. However, the present invention is not limited thereto. The gap g is made higher than the seal height h, and a mechanism for controlling the seal discharge amounts may be provided in a nozzle of the dispenser.

Sixth Embodiment

In the first embodiment, the first extension portion EX1 and the second extension portion EX2 are arranged on extended lines of one side of the ring portion RNG. This arrangement allows the track TR1 to be a straight line, thus facilitating the drawing and increasing the drawing speed. However, the present invention is not limited thereto. The dispenser is allowed to meander even the track TR1, as similar to the tracks TR2 to TR10, and the double-drawing areas DDs may be displaced from the extended lines of one side of the ring portion RNG.

Seventh Embodiment

The control of the seal discharge amounts in which the double-drawing is performed while making the gap g substantially equal to the seal height h, as explained in FIGS. 4 and 5 in the first embodiment is not limited to the seal coating pattern as in the first embodiment, and the present invention can be applied to all patterns for which the double-drawing is performed.

For example, in the case where only a ring portion without having the extension portions EX1 and EX2 is independently drawn, the present invention can be applied to a case where the double-drawing is performed for a part of the ring portion in order to shape a completely-closed ring portion. Even in this case, when the sealing material is formed using the dispenser in a double-drawing manner, it is possible to obtain an effect that after sticking the substrates together, the seal width at a portion where the double-drawing is performed can be substantially the same as that at a portion where the double-drawing is not performed.

Even in the case where other patterns are drawn, if the pattern is a pattern in which the dispenser passes over the same position twice, the sealing material is hardly discharged even if the double-drawing is performed in a state where the dispenser can discharge the sealing material. Thus, it is possible to draw a free pattern without controlling the nozzle to stop the discharge of the sealing material, to avoid a problem that the seal width is increased at a portion where the double-drawing is performed, and to reduce the usage of the sealing material.

The present invention is not limited to a seal pattern used for a liquid crystal dropping-enclosure method, and may be applied to a case where a pattern having a liquid crystal enclosure port is drawn.

The present invention has been explained above by using the embodiments. The configuration explained in each embodiment is merely an example, and the present invention can be appropriately changed in a range without departing from its technical idea. The configurations explained in the respective embodiments can be used by combining the same with each other as long as the respective embodiments do not conflict with each other.

What is claimed is:

1. A liquid crystal display device comprising a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, wherein the sealing material includes a ring portion in a ring shape which configures the liquid crystal enclosure area and whose whole circumference is closed, and a first extension portion and a second extension portion, each of which is integrally connected to the ring portion and is arranged outside the ring portion, the first extension portion extends up to a cut-end portion of a first side of the liquid crystal display panel, the second extension portion extends up to a cut-end portion of a second side of the liquid crystal display panel, the second side being opposed to the first side, and in a state where the first substrate and the second substrate are stuck together, $W2 \leq W1 \leq 1.2W2$ is satisfied where W1 represents a seal width of the first extension portion and a seal width of the second extension portion, and W2 represents a seal width of the ring portion.

2. The liquid crystal display device according to claim 1, wherein the first extension portion and the second extension portion are present on an extended line of a side of the ring portion.

3. The liquid crystal display device according to claim 1,
wherein the sealing material is formed by coating using a dispenser,
the sealing material is configured by a first drawing pattern including a first side of the ring portion and a second drawing pattern including a second side, a third side and a fourth side, other than the first side, of the ring portion, and
the dispenser passes over the first extension portion and the second extension portion during the time the dispenser draws both of the first drawing pattern and the second drawing pattern.

4. The liquid crystal display device according to claim 2,
wherein the sealing material is formed by coating using a dispenser,
the sealing material is configured by a first drawing pattern including a first side of the ring portion and a second drawing pattern including a second side, a third side and a fourth side, other than the first side, of the ring portion, and
the dispenser passes over the first extension portion and the second extension portion during the time the dispenser draws both of the first drawing pattern and the second drawing pattern.

5. A manufacturing method of a liquid crystal display device comprising a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material, the sealing material including a ring portion in a ring shape which configures the liquid crystal enclosure area and whose whole circumference is closed, and a first extension portion and a second extension portion, each of which is integrally connected to the ring portion and is arranged outside the ring portion, the method comprising:
  a first coating step in which the dispenser is allowed to move in a first drawing pattern on the first substrate and the first substrate is coated with the sealing material configuring a part of the ring portion, the first extension portion, and the second extension portion;
  a second coating step in which after the first coating step, the dispenser is allowed to move in a second drawing pattern on the first substrate and the first substrate is coated with the sealing material configuring the rest of the ring portion;
  a liquid crystal dropping step in which the liquid crystal is dropped into the inside of the ring portion;
  a sticking step in which after the liquid crystal dropping step, the first substrate and the second substrate are stuck together; and
  a cutting step in which after the sticking step, the first substrate and the second substrate are cut in the mid-course of the first extension portion and in the mid-course of the second extension portion,
wherein the first extension portion and the second extension portion are arranged on sides, which are opposed to each other, of the liquid crystal display panel,
in the second coating step, the dispenser passes over the first extension portion and the second extension portion in a state where a seal discharge amount per unit length is smaller than that for the ring portion, and
in a state where the first substrate and the second substrate are stuck together, $W2 \leq W1 \leq 1.2W2$ is satisfied where W1 represents a seal width of the first extension portion and a seal width of the second extension portion, and W2 represents a seal width of the ring portion.

6. The manufacturing method of a liquid crystal display device according to claim 5,
wherein in the second coating step, the dispenser passes over the first extension portion and the second extension portion in a state where $0.8h \leq g \leq 1.2h$ is satisfied where g represents a gap ranging from a surface of the first substrate to the dispenser and h represents a height ranging from a surface of the first substrate to an upper face of the sealing material of the first extension portion and the second extension portion.

7. The manufacturing method of a liquid crystal display device according to claim 5,
wherein prior to the cutting step, a second ring portion connected to the ring portion through the first extension portion and a third ring portion connected to the ring portion through the second extension portion are provided.

8. The manufacturing method of a liquid crystal display device according to claim 6,
wherein prior to the cutting step, a second ring portion connected to the ring portion through the first extension portion and a third ring portion connected to the ring portion through the second extension portion are provided.

9. The manufacturing method of a liquid crystal display device according to claim 7,
wherein prior to the cutting step, the second ring portion is connected to a fourth ring portion through the sealing material having a third extension portion extending in a direction crossing the extension direction of the first extension portion.

10. A manufacturing method of a liquid crystal display device comprising a liquid crystal display panel having: a first substrate; a second substrate; a sealing material through which the first substrate and the second substrate are stuck together; and a liquid crystal enclosed inside a liquid crystal enclosure area encircled by the first substrate, the second substrate, and the sealing material,
wherein when the first substrate is coated with the sealing material by a dispenser, the dispenser passes over the same position twice, and
the dispenser passes over the sealing material with which the first substrate is already coated in a state where $0.8h \leq g \leq 1.2h$ is satisfied where g represents a gap ranging from a surface of the first substrate to the dispenser and h represents a height ranging from a surface of the first substrate to an upper face of the sealing material with which the first substrate is already coated, and in a state where a seal discharge amount per unit length is smaller than that with which the dispenser passes over for the first time.

11. The manufacturing method of a liquid crystal display device according to claim 10,
wherein the sealing material includes a ring portion in a ring shape which configures the liquid crystal enclosure area and whose whole circumference is closed.

12. The manufacturing method of a liquid crystal display device according to claim 11,
wherein the sealing material includes a first extension portion and a second extension portion, each of which is integrally connected to the ring portion and is arranged outside the ring portion,
the first extension portion extends up to a cut-end portion of a first side of the liquid crystal display panel, and the second extension portion extends up to a cut-end portion of a second side of the liquid crystal display panel, the second side being opposed to the first side.

13. The manufacturing method of a liquid crystal display device according to claim 12,
wherein the dispenser passes over each of the first extension portion and the second extension portion twice.

14. The manufacturing method of a liquid crystal display device according to claim 13,
wherein in a state where the first substrate and the second substrate are stuck together, $W2 \leqq W1 \leqq 1.2W2$ is satisfied where W1 represents a seal width of the first extension portion and a seal width of the second extension portion, and W2 represents a seal width of the ring portion.

15. The manufacturing method of a liquid crystal display device according to claim 12,
wherein in a state where the first substrate and the second substrate are stuck together, $W2 \leqq W1 \leqq 1.2W2$ is satisfied where W1 represents a seal width of the first extension portion and a seal width of the second extension portion, and W2 represents a seal width of the ring portion.

16. The manufacturing method of a liquid crystal display device according to claim 12,
wherein the first extension portion and the second extension portion are present on an extended line of a side of the ring portion.

17. The manufacturing method of a liquid crystal display device according to claim 13,
wherein the first extension portion and the second extension portion are present on an extended line of a side of the ring portion.

18. The manufacturing method of a liquid crystal display device according to claim 12,
wherein prior to cutting of the first substrate and the second substrate in a state where the first substrate and the second substrate are stuck together, a second ring portion connected to the ring portion through the first extension portion and a third ring portion connected to the ring portion through the second extension portion are provided.

19. The manufacturing method of a liquid crystal display device according to claim 13,
wherein prior to cutting of the first substrate and the second substrate in a state where the first substrate and the second substrate are stuck together, a second ring portion connected to the ring portion through the first extension portion and a third ring portion connected to the ring portion through the second extension portion are provided.

20. The manufacturing method of a liquid crystal display device according to claim 18,
wherein prior to cutting of the first substrate and the second substrate in a state where the first substrate and the second substrate are stuck together, the second ring portion is connected to a fourth ring portion through the sealing material having a third extension portion extending in a direction crossing the extension direction of the first extension portion.

* * * * *